Patented Nov. 18, 1930

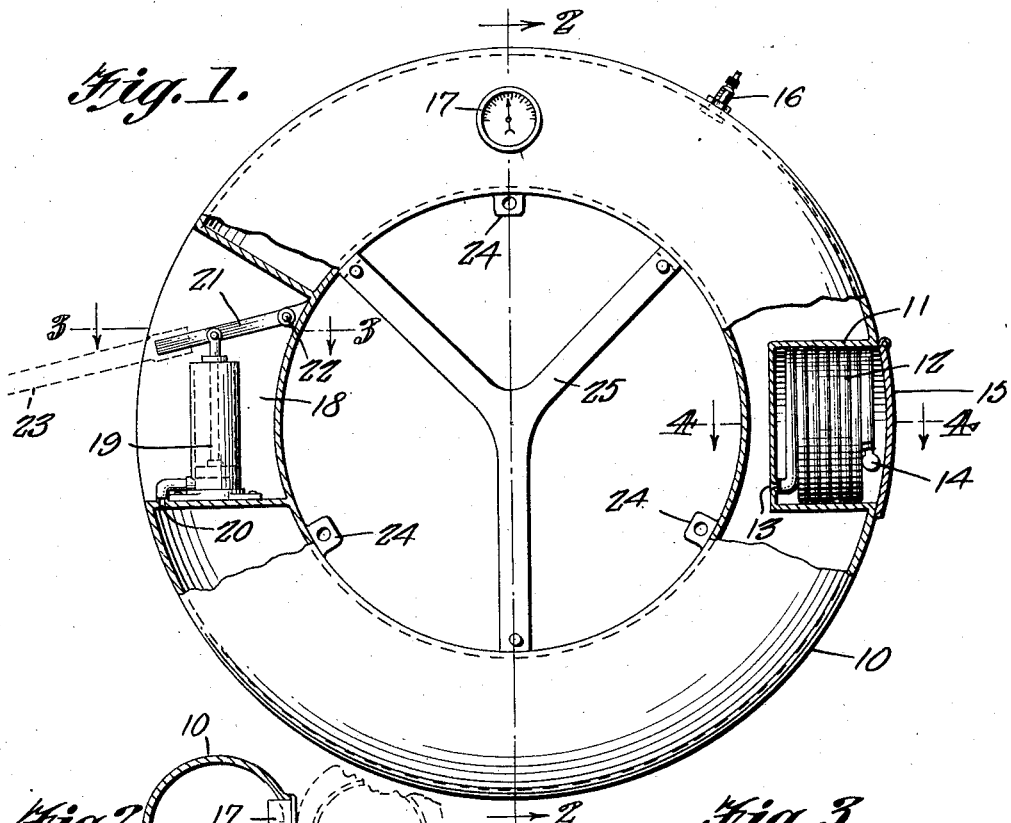
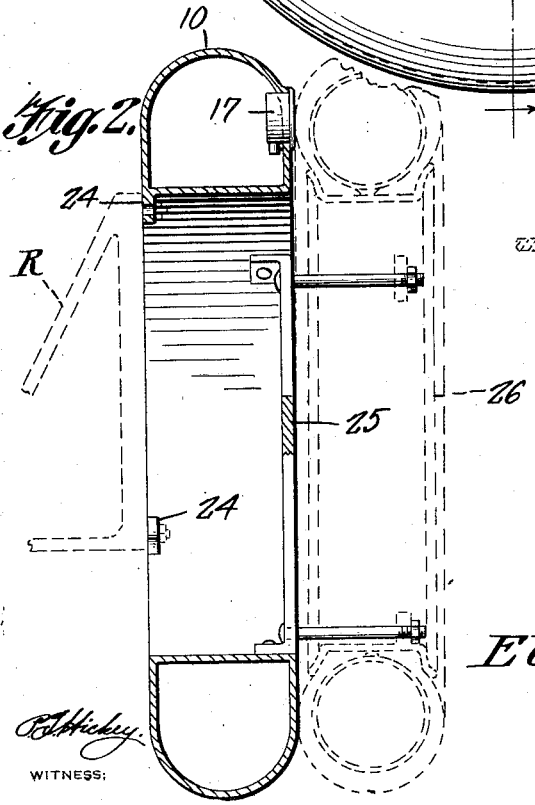
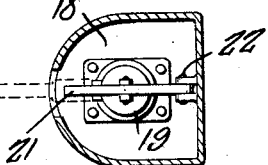
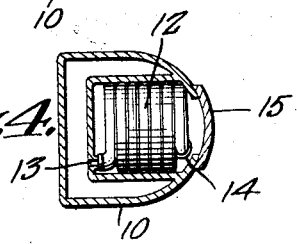

1,782,271

UNITED STATES PATENT OFFICE

ELONZA A. PENNINGTON, OF ARKADELPHIA, ARKANSAS

AIR-STORAGE TANK

Application filed October 17, 1928. Serial No. 313,084.

This invention relates to improvements in air storage tanks and has for an object the provision of a tank which will closely simulate a tire, and which is adapted to be secured to the tire rack of an automobile for the purpose of carrying a supply of air under pressure for use in inflating the tires of the automobile.

Another object of the invention is the provision of a tank of the above character which includes a compartment for storing an air hose, so that the latter will be at all times handy for use for inflating the tires.

With the above and other objects in view, the invention further includes the following novel features and details of construction, to be hereinafter more fully described, illustrated in the accompanying drawings and pointed out in the appended claims.

In the drawings:—

Figure 1 is an elevation of the invention with parts broken away to more clearly illustrate the construction.

Figure 2 is a section on the line 2—2 of Figure 1 showing by dotted lines the tank attached to a tire rack and a spare tire carried by the tank.

Figure 3 is a section on the line 3—3 of Figure 1.

Figure 4 is a section on the line 4—4 of Figure 1.

Referring to the drawings in detail wherein like characters of reference denote corresponding parts, the reference character 10 indicates an air storage tank which is annular in form and which conforms substantially in appearance to a spare tire. The tank is designed to carry a supply of air under pressure for inflating the tires of an automobile and for the purpose of conveniently carrying the tank and so that it will not detract from the appearance of the automobile, the tank is attached to the automobile tire rack indicated by the dotted lines R in Figure 2. The tank thus has the appearance of a spare tire mounted on the rack.

The tank is provided with a compartment or chamber 11 for storing an air hose 12, one end of the hose being in communication with the interior of the tank as shown at 13, while the opposite end may carry a valve of the type commonly used upon the outer end of an air hose in service stations, the valve being indicated at 14. The compartment 11 is normally closed by a door 15.

The tank 10 is provided with a valve 16 for the introduction of air under pressure which may be obtained from the usual service station and this valve may be of the type ordinarily employed with the inner tubes of pneumatic tires. The tank may also be provided with an air gauge 17 so as to indicate the amount of air in the tank.

For use in emergencies, the tank may be provided with a compartment 18 within which is positioned an air pump 19, the latter having communication with the interior of the tank 10 through a port 20. The pump is provided with a handle 21 which is pivotally secured to the tank as shown at 22 and which may be provided with a detachable extension indicated by the dotted lines at 23 in Figure 1 of the drawings. The tank is provided with apertured lugs 24 for receiving the bolts of the tire rack, or any other means may be substituted for the lugs, the particular means employed being determined by the character and type of the tire rack.

The tank also carries an auxiliary tire rack 25 by means of which a spare tire indicated by the dotted lines in Figure 2 may be carried. The tire rack 25 not only serves to provide means for the attachment of a spare tire, but acts to reinforce and lend rigidity to the tank.

The invention is susceptible of various changes in its form, proportions and minor details of construction and the right is herein reserved to make such changes as properly fall within the scope of the appended claims.

Having described the invention what is claimed is:—

1. In an air storage tank, an annular hollow member of substantially the same size and configuration as an automobile tire, means whereby air under pressure may be introduced into the tank, a hose compartment arranged within the tank, a door for closing the compartment, and a hose within the compartment and having communication with the tank.

2. In an air storage tank, an annular hollow member, a pump compartment within said member, a pump located within the compartment and adapted to force air under pressure into the tank, a controlled air outlet for the tank, and means to attach a tire rim to the tank.

3. In combination, an air storage tank of annular hollow contour and of the same size and configuration as an automobile tire, a substantially Y-shaped bracket secured to the inner periphery of the tank adjacent one side thereof, arms projecting from the stem and branches of said bracket wholly beyond one side of the tank and utilized as a tire rim support, means whereby air under pressure may be introduced into the tank, and a controlled air outlet for the tank.

4. In an air storage tank, an annular hollow member of substantially the same size and configuration as an automobile tire formed with a compartment opening at the periphery of the tank, a pump supported by one wall of the compartment within the latter and communicating with the tank to supply the latter with air under pressure, said tank having a second compartment diametrically opposite the first named compartment, the walls of the second compartment projecting within the tank and of annular contour, a door for closing the second mentioned compartment, and a hose normally coiled within the compartment having communication with the tank.

In testimony whereof I affix my signature.

ELONZA A. PENNINGTON.